Figure 1:
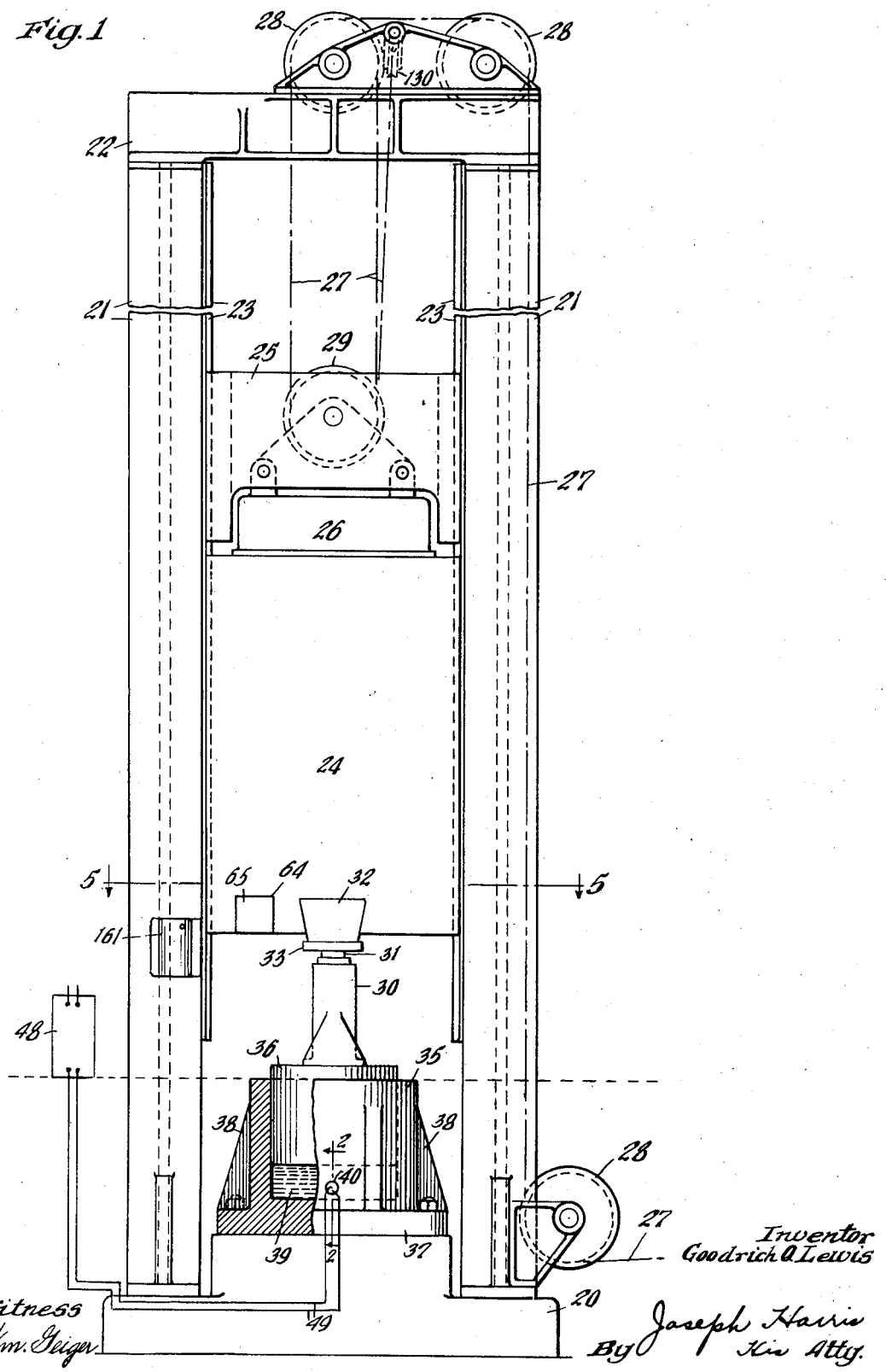

Aug. 8, 1933.  G. Q. LEWIS  1,921,624
TESTING APPARATUS
Filed Dec. 3, 1930   2 Sheets-Sheet 1

Witness
Wm. Geiger

Inventor
Goodrich Q. Lewis
By Joseph Harris
His Atty.

Aug. 8, 1933.  G. Q. LEWIS  1,921,624
TESTING APPARATUS
Filed Dec. 3, 1930    2 Sheets-Sheet 2
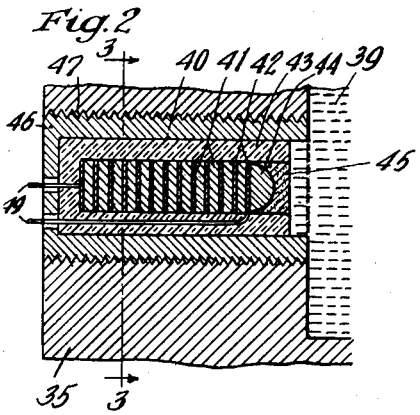
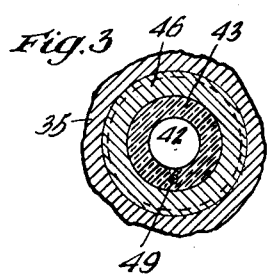
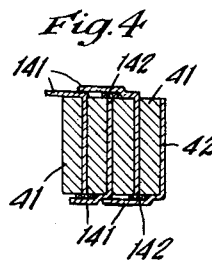
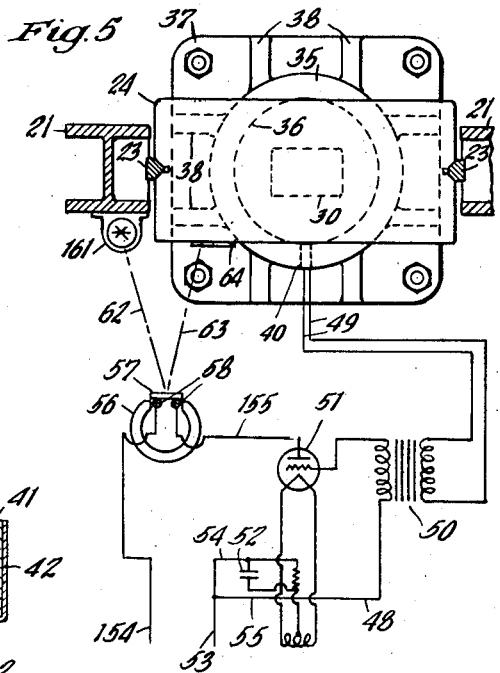
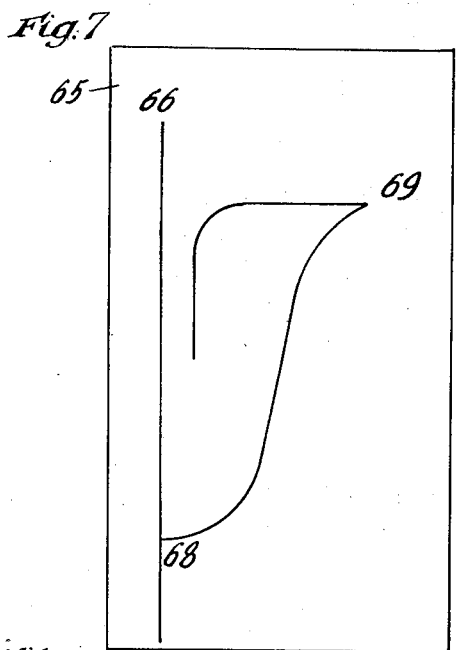
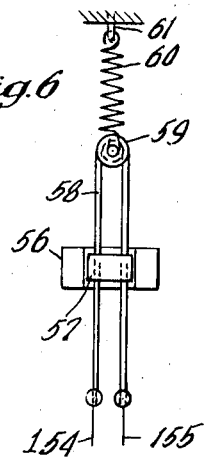
Inventor
Goodrich Q. Lewis
By Joseph Harris
his Atty.
Witness
Wm. Geiger Patented Aug. 8, 1933

1,921,624

UNITED STATES PATENT OFFICE 1,921,624

TESTING APPARATUS

Goodrich Q. Lewis, Wheaton, Ill., assignor to W. H. Miner, Inc., Chicago, Ill., a Corporation of Delaware Application December 3, 1930. Serial No. 499,644

7 Claims. (Cl. 265—2)

This invention relates to improvements in machines for testing and registering the operation of shock absorbing mechanisms, especially those employed in connection with railway draft riggings.

In testing shock absorbing mechanisms, it is the usual practice to employ a drop hammer by which the mechanism is compressed, a chronograph being employed to record the tests. The type of chronograph almost universally employed for this purpose produces graphs or diagrams giving the relation of travel of the gear with reference to the time of compression of the same. In order to obtain the information desired or data as to the performance of the shock absorbing mechanisms being tested, that is the force exerted with reference to the travel, the pressure exerted by the gear at any instant with relation to the travel of the gear, and the total amount of work done by the shock absorbing mechanism at any point of its travel, it is necessary to transform the information obtained by the chronograph method, thus making necessary a great deal of highly technical analysis.

The graph outlined by the chronograph giving the relation of travel of the gear with reference to the time of compression of the same, in order to obtain the force travel curve, it is necessary to first differentiate the travel or space-time curve and obtain a velocity-time curve and then differentiate the velocity-time curve with reference to time to obtain the acceleration or force-time curve and then change the acceleration or corresponding force-time curve to force-travel by replotting the force on a travel base, using increments of travel corresponding to the increments of time.

The main object of my invention is to provide a testing and registering apparatus which gives directly the desired force-travel diagram or graph, thereby entirely eliminating the technical analysis hereinbefore mentioned.

More specifically stated, the object of this invention is to provide simple, efficient and practical means for accurately testing and registering the action of a shock absorbing device under sudden shocks or blows, and more particularly producing a graph or diagram showing directly the pressure being exerted by any shock absorbing mechanism in relation to its travel, while being compressed by a drop hammer or similar testing device, thereby giving an accurate reading of the pressure at any instant with relation to the absolute travel of the gear, and further showing the complete cycle of pressure with reference to the compression and release strokes of the device.

Other objects of the invention will more clearly appear from the description and claims hereinafter following.

In the drawings, forming a part of this specification, Figure 1 is a front, elevational view of a drop hammer testing apparatus, illustrating my improvements in connection therewith, certain of the parts being shown in section. Figure 2 is an enlarged, vertical, sectional view, broken away, corresponding substantially to the line 2—2 of Figure 1. Figure 3 is a vertical, sectional view corresponding to the line 3—3 of Figure 2 and illustrating the details of a certain electrical gauge. Figure 4 is an enlarged, sectional view, showing in part the arrangement of the parts of the electrical gauge illustrated in Figures 2 and 3. Figure 5 is a horizontal, sectional view corresponding to the line 5—5 of Figure 1, the weight of the drop hammer being shown in plan, and certain parts of the mechanism being illustrated diagrammatically. Figure 6 is a diagrammatic view illustrating the arrangement of a certain magnet and mirror employed in connection with the apparatus, as illustrated in Figure 5. And Figure 7 shows a typical graph produced by my improved apparatus.

In said drawings, the drop hammer illustrated is of well known type and comprises a base member 20, which is rigidly supported and forms the base proper of the machine. Means, hereinafter described, on which the draft gear or cushioning means being tested is placed, is mounted on the base member. The base member 20 has upstanding spaced arms 21—21 fixed thereto, which are rigidly connected at their upper ends by a cross-tie member 22. The two posts 21—21 are provided with guides 23—23 on the inner sides thereof and a weight or drop hammer block 24 is slidable vertically between the posts 21—21 and has guide grooves on opposite sides thereof cooperating with the guides 23—23 on the inner sides of said posts. The hammer is so mounted that it will fall freely between the guides between the posts 21—21. A lifting head 25 is also guided between the posts 21—21 and is disposed above the weight or block 24, an electromagnet 26 being suspended from the lifting head and cooperating with the hammer in order to raise the same when desired. Mechanism of well known type is provided for lifting the hammer, including a motor, not shown, having a winding drum thereon, upon which a cable 27 connected to the lifting head 25 is adapted to be wound, the cable passing over guide sheaves or pulleys 28—28 mounted on the frame of the testing apparatus and guide pulleys or sheaves 29 rotatably connected to the lifting head 25. Approximately midway of the length thereof, the cable 27 is hung over a small pulley 130, the opposite ends of the cable being fixed to the winding drum, the two sections of the cable being guided over the pulleys 28—28 and passed around the last pulleys 28 and 29 a plurality of times. As is well known in testing draft gears, the weight of the testing apparatus is dropped a number of times on the gear. The weight is lifted by means of the head 25, which is raised through the operation of the motor on which the cable 27 is wound. During the lifting operation, the weight 24 is raised through the medium of the electromagnet 26 secured to the head 25. When the weight 26 has been raised to the desired height, the current is cut off, thereby deenergizing the magnet, thus releasing the weight and permitting the same to drop on the gear or cushioning means, which is indicated by 30 in Figure 1.

The gear illustrated is of the well known friction type, having the usual friction shoes and wedge member cooperating with a friction shell, a main spring resistance being disposed within the shell, opposing inward movement of the friction means. The wedge of the friction shock absorbing mechanism is indicated by 31. The weight or hammer 24 is provided with a hardened impact block 32 which directly delivers the blow, and a follower plate 33 is placed on the wedge block 31 and receives the blow directly from the block 32.

In carrying out my invention, I provide a casting 35 in the form of a cylinder having a piston 36 slidable therein, the piston 36 forming an anvil member on which the cushioning device 30, being tested, is supported. The cylinder 35 is supported on and fixed to the base member 20 of the drop hammer, the same being shown as provided with a base flange 37 bolted to the member 20. The flange 37 is suitably reinforced by vertical webs 38—38 formed integral therewith and with the vertical side walls of the cylinder proper.

As shown in Figure 1, the bottom end face of the piston is normally spaced above the bottom wall of the cylinder and this space is filled with a suitable fluid, as indicated at 39. The fluid employed is preferably oil.

An electric gauge 40 is mounted within the side wall of the cylinder, the gauge being exposed to the pressure existing in the cylinder, at all times. As most clearly illustrated in Figures 2, 3 and 4, the electric gauge 40 is composed of a plurality of quartz discs 41—41 arranged in series and spaced apart by silver foil discs 42—42. Each quartz disc is cut with the vertical front and rear surfaces thereof perpendicular to the electrical axis of the quartz. The discs 41 and 42 are contained in a cylinder 43 of insulating material, preferably bakelite. At the righthand end, as viewed in Figure 2, the discs are capped by a plug 44, preferably of steel, the plug being in the form of a half ball member having the flat face thereof abutting the silver foil disc interposed between the same and the quartz disc 41 at the inner end of the series.

The plug 44 is spaced from the inner end of the cylinder 43, as shown most clearly in Figure 2, and is covered by paraffin 45, which fills the end of the cylinder and seals the same. The outer surface of the paraffin filler is directly exposed to the oil in the interior of the cylinder 35. As clearly shown in Figure 2, one of the silver foil discs 42 is interposed between the closed, lefthand end of the cylinder 43 and the quartz disc 41 at that end of the series. Alternate discs 42—42 are electrically connected by tabs 141—141, as clearly shown in Figure 4, each disc having the tabs formed integral therewith, the tabs of adjacent discs being on opposite sides thereof and being separated from the next adjacent disc by insulating material 142 interposed between said disc and the tab. The insulating material may be paper, fiber or any other well known substance used for that purpose. The cylinder 43 is enclosed in a jacket 46 in the form of an exteriorly threaded steel cylinder, closed at the outer end and fixed in a screw threaded bore 47, in the side wall of the cylinder 35. The electric gauge 40 is in circuit with an amplifying set, indicated generally by 48 in Figure 5, an electric conductor wire 49 having its opposite ends electrically connected respectively to the silver foil discs at the inner and outer ends of the series of quartz discs 41—41, as shown in Figure 2. As is well known, when the gauge 40 composed of the plurality of quartz discs 41—41 is placed under compression, an electromotive force is produced, which is directly proportional to the pressure. As will be evident, the pressure within the cylinder 35 at any particular instant is directly communicated to the gauge 40 and an electromotive force proportional to said pressure is set up in the circuit provided by the conductor 49 and is amplified by the set 48. The amplifying set, as shown in Figure 5 preferably includes a transformer 50, an amplifying tube 51 and a condenser 52. Electric current for the amplifying set is provided by a conducting wire 53 leading from a source of supply of electrical energy, the system being grounded by the wire 154. The transformer 50, amplifying tube 51 and condenser 52 are connected up in a well known manner, the conductor 53 having branches 54 and 55, the branch 54 being electrically connected to the condenser and the tube 51, and the branch 55 being in circuit with the transformer and electrically connected to the tube 51. The outlet conducting wire of the amplifying set is indicated by 155. A permanent magnet 56 of the horse shoe type is mounted on a fixed support, not shown, the support being disposed either in front or in back of the drop hammer. As shown in the present instance, the horse shoe magnet is located in front of the hammer and at such a height that it is opposed to the outer face of the hammer as the latter travels downwardly in striking the draft gear 30. A reflecting mirror 57 is mounted within the field of the magnet 56, being supported on spaced sections of a conducting wire 58 trained over a small pulley or sheave 59. The sheave 59 is supported from any suitable fixed means by a spring 60 having its opposite ends secured to said pulley 59 and any suitable anchoring member 61 fixed to a convenient part of the building containing the testing apparatus. The branches of the conductor 58 are in circuit with the amplifying set of the apparatus, being electrically connected to the wires 154 and 155, as clearly illustrated in Figure 6. Inasmuch as the wire or rods on which the mirror is supported are located within the field of the permanent magnet 56, any electrical impulse created within the wires by the amplifying set will cause a deflection of the mirror; that is the mirror will be oscillated about its pivotal center, which corresponds to the axis of the supporting coil spring 60. The lefthand post member 21 of the testing apparatus has a projector 161 mounted thereon at such a height that the same projects a beam of light, indicated by 62, on the mirror 57. This beam of light is reflected, as indicated at 63, to the face of the hammer or weight 24. Any suitable supporting means 64 is provided on the face of the hammer for holding a record card or sheet 65 of sensitized paper. As will be evident, when the hammer of the testing apparatus is dropped, the sensitized recording sheet 64 will travel in a vertical path and the projected beam of light will trace a vertical line thereon during such movement, unless the mirror is deflected or oscillated. In such movement the straight line traced would have the position indicated by 66—67 in Figure 7. Any pressure created within the cylinder 35 of the testing apparatus, which is connected to the electrical gauge 40, will cause an electrical impulse within the circuit of the transformer and this impulse will be amplified, by the amplifying set, thereby causing a current to flow through the supporting rods or wires of the mirror. Due to the current thus created, the mirror will be deflected to a certain extent, the extent of deflection varying in accordance with the amount of current passing through the supporting rods or wires of the mirror and proportionate to the variations of pressure encountered in the cylinder 35. As will be clear in the testing of a shock absorbing mechanism, the diagram or graph shown in Figure 7 will be produced, that is the beam of light reflected by the mirror will trace a line substantially corresponding to the line 68—69, shown in Figure 7, during the dropping of the hammer while compressing the shock absorbing mechanism or cushioning device 30. The amount of vertical travel of the beam of light in tracing the line 68—69 represents the amount or extent to which the shock absorbing device or cushioning means is compressed, and corresponds to the amount of travel of the dropping hammer during such compression. The distance of displacement of the line 68—69, at any given point, from the base line 66—67 graphically represents the proportionate amount of pressure created by the draft gear being compressed. In the operation of my improved testing apparatus, the shock absorbing mechanism to be tested is placed upon the piston 36 forming the anvil member of the device. In the present instance, the shock absorbing mechanism is shown of the friction type and a follower plate 33, as hereinbefore pointed out, is placed on top of the wedge member thereof. The hammer 24 is now raised to the desired height and dropped on the shock absorbing mechanism, compressing the same while supported by the piston 36. The pressure of the shock absorbing mechanism while being compressed by the hammer 24 is directly communicated to the oil, indicated by 39, within the cylinder. Inasmuch as oil is a substantially non-compressible fluid, the pressure is directly communicated to the electrical gauge 40. Due to the compression of the quartz discs forming the gauge, an electrical impulse is created in the wires and the light reflecting mirror 57 oscillated in the manner hereinbefore described, thereby projecting the beam of light onto the sensitized recording sheet 65 while the same is traveling downwardly with the hammer. As will be evident, the tracing of the line 68—69, shown in Figure 7, thus begins at the bottom of the recording sheet and the beginning of such line indicates the initiation of the compression stroke of the shock absorbing device. The upper termination of the line 68—69 indicates the full compression of the mechanism and the horizontal line extending to the left therefrom, which terminates in a line parallel to the base line 66—67 indicates the release action of the device and recoil of the same with the weighted hammer 24.

Thus, when the hammer is dropped on the shock absorbing device, the pressure developed by the latter is shown to scale in terms of the amount of deflection of the light beam to the right of the zero line 66—67, as shown in Figure 7. The absolute pressure at any instant is shown in relation to the absolute travel of the gear. It is, therefore, obvious that the area of the diagram in square inches has a direct relation to the number of inch or foot pounds of work done by the hammer upon the gear or vice versa. Diagrams produced direct in terms of force and travel show the two fundamental considerations of draft gear performance, these being the force at any point of travel and the total amount of work done by said force at any point of travel.

By my improved testing apparatus, the element of time is eliminated, the record of the absolute pressure generated at any instant in the cylinder of the drop hammer being directly recorded, the recording of the same being made possible by employing the electrical gauge and the oscillating mirror controlled thereby, which means is fast enough to instantly indicate the exact pressure, by recording a pressure proportionate to that actually existing within the cylinder. As will be obvious, the diagram produced by my improved recording apparatus thus shows the complete cycle of pressure with reference to the compression and release strokes of the shock absorbing mechanism. By mounting the sensitized paper directly on the moving hammer, the result of force-travel is directly produced without any reference to time because at any instant of hammer position or gear travel, the pressure is being recorded on the record sheet, which is moving exactly in synchronism with the compression travel of the cushioning means.

I have herein shown and described what I now consider the preferred manner of carrying out my invention, but the same is merely illustrative and I contemplate all changes and modifications that come within the scope of the claims appended hereto.

I claim:

1. In a device for testing shock absorbing mechanisms, the combination with a weighted impact member adapted to be dropped onto the mechanism being tested to compress the same; a record sheet operatively connected to and movable with said impact member; a support for a shock absorbing mechanism; a container; a non-compressible pressure-transmitting medium confined by said container and opposing displacement of said support; an electrical pressure gauge constantly subjected to the pressure exerted by said non-compressible medium while said shock absorbing mechanism is being compressed against said support; means for amplifying the electrical impulse produced by said gauge; and means actuated by said amplifying means for tracing a graph on said sheet while moving with the impact member.

2. In a device for testing shock absorbing mechanisms, the combination with a weighted impact member adapted to be dropped onto the mechanism being tested to compress the same; of a sensitized recording sheet operatively connected to and actuated by said impact member; a support for the shock absorbing mechanism being tested; a container; a non-compressible pressure-transmitting medium confined within the container, opposing displacement of said support; an electrical pressure gauge in communication with said container and constantly subjected to the pressure exerted through said medium by said shock absorbing mechanism being compressed against said support; means for amplifying the electrical impulse produced by said gauge; means actuated by said amplifying means for tracing a graph on said sheet while moving with the impact member, said means including an oscillating member; and means for projecting a beam of light from said oscillating member, said oscillating member being displaced in accordance with the amount of said amplified electrical energy, for projecting a beam of light on said sensitized record sheet.

3. In a device for testing shock absorbing mechanisms, the combination with a weighted impact member adapted to be dropped onto the mechanism being tested to compress the same; of a sensitized record sheet supported by and movable with the impact member and in the same direction; a support for the shock absorbing mechanism being tested, and against which the same is compressed; fixed means for projecting a beam of light; a reflecting mirror mounted for oscillation about an axis parallel to the direction of movement of said sheet for reflecting said beam of light and projecting the same on said sensitized record sheet; an electrical pressure gauge; means for transmitting pressure from said support to said gauge; means for amplifying the electrical impulse produced by said gauge; a permanent magnet; and armature means in the field of said magnet and energized by said amplifying means for oscillating said mirror.

4. In a device for testing shock absorbing mechanisms, the combination with a weighted impact member adapted to be dropped onto the mechanism being tested to compress the same; of a sensitized record sheet mounted on and movable with the impact member and in the same direction; a support for the mechanism being tested and against which the same is compressed; fixed means for projecting a beam of light; a mirror mounted for oscillatory movement about an axis parallel to the direction of movement of said sheet for reflecting the projected beam of light on said sensitized sheet; an armature fixed to said mirror; a permanent magnet in the field of which said armature is disposed; an electrical pressure gauge; means for transmitting pressure from said support to said gauge; means for amplifying the electrical impulse produced by said electrical gauge and energizing said armature in accordance with the pressure measured by said gauge, thereby causing the mirror to oscillate and the beam of projected light to travel across said sheet.

5. In a device for testing shock absorbing mechanisms, the combination with a fixed base member; of a cylinder mounted on said base member; a piston cooperating with said cylinder, said piston forming the support for the shock absorbing mechanism being tested; a substantially non-compressible fluid within the cylinder and confined by said cylinder and piston; a weight member adapted to be dropped on said shock absorbing mechanism; a record sheet fixed to and movable in unison with said weight member; a gauge member having communication with the interior of said cylinder and exposed to the pressure of the fluid therein, said gauge including quartz discs adapted to be compressed through the pressure of said fluid, thereby creating an electrical impulse; means for amplifying said impulse; and means actuated by said last named means for tracing a graph on said sheet.

6. In a device for testing shock absorbing mechanisms, the combination with a weight member adapted to be dropped on the shock absorbing mechanism being tested to compress the latter; of a record sheet fixed to and movable in unison with the weight and in the same direction; a base member; a cylinder fixedly supported on the base member; a piston cooperating with said cylinder and directly sustaining the shock absorbing mechanism being tested; a substantially non-compressible fluid confined by said cylinder and piston and directly sustaining said piston; an electrical gauge including a series of quartz discs and a series of discs of conducting material, said quartz discs and conducting discs being alternated, said conducting discs being electrically connected to each other; a casing housing said discs, said casing being open at one end, the open end of said casing communicating with the interior of the cylinder, thereby exposing said two series of discs to the pressure of the fluid within the cylinder; an amplifying means cooperating with said gauge; and means actuated by said amplifying means for tracing a graph on said record sheet while the same is moving with the weight.

7. In a device for testing shock absorbing mechanisms, the combination with means for supporting the shock absorbing mechanism being tested, including a cylinder, a cooperating piston and a substantially non-compressible fluid confined by said cylinder and piston, said cylinder having a bore in one of the walls thereof; of an impact member movable toward and away from said supporting means and adapted to engage said shock absorbing mechanism and compress the same against said supporting means; a holder for a record sheet fixed to said impact member; a record sheet fixed within said holder; an electrical gauge; a sleeve housing said gauge, said sleeve being fixed in the bore of the cylinder wall and being open at the inner end, thereby exposing the gauge to the fluid within the cylinder; means for tracing a graph on said record sheet while the same is moving with the impact member; and means controlled by the pressure of said gauge for actuating said tracing means.

GOODRICH Q. LEWIS.